Dec. 30, 1969     W. E. BEUTLER ET AL     3,486,179

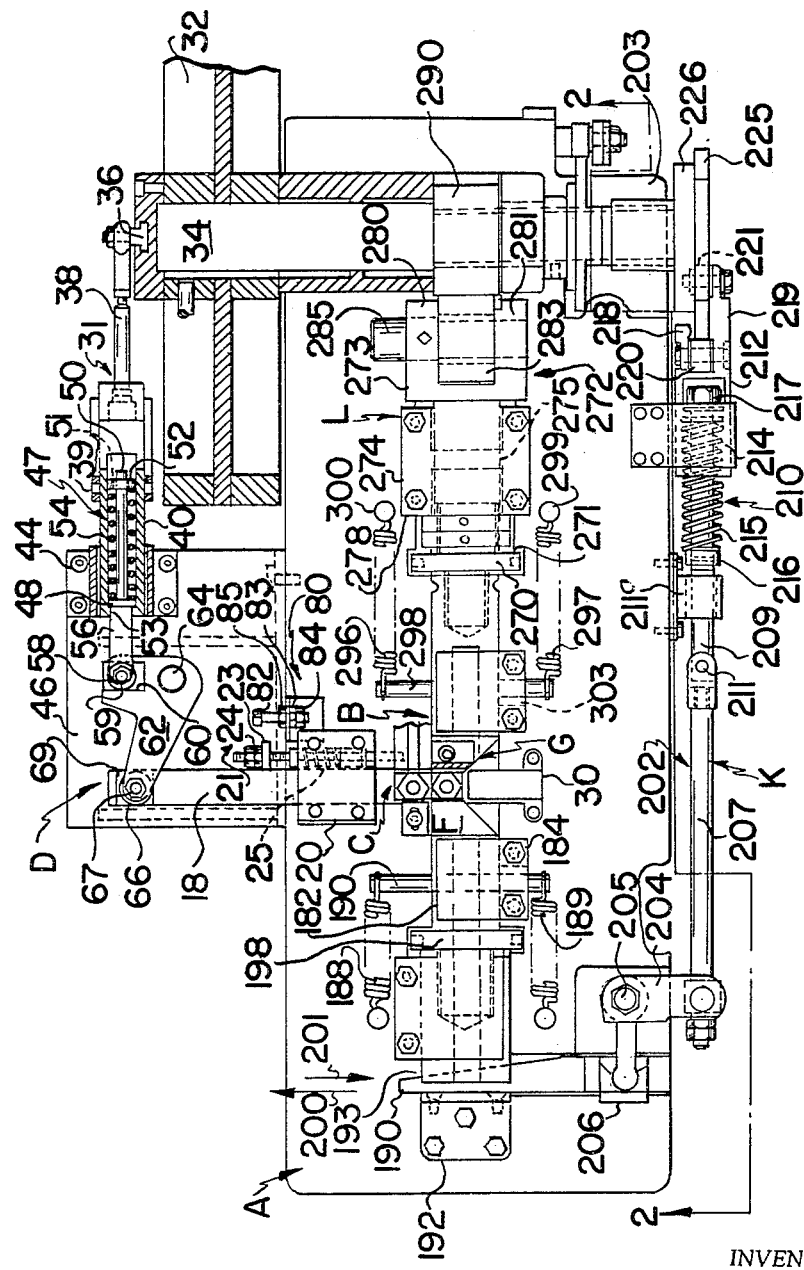

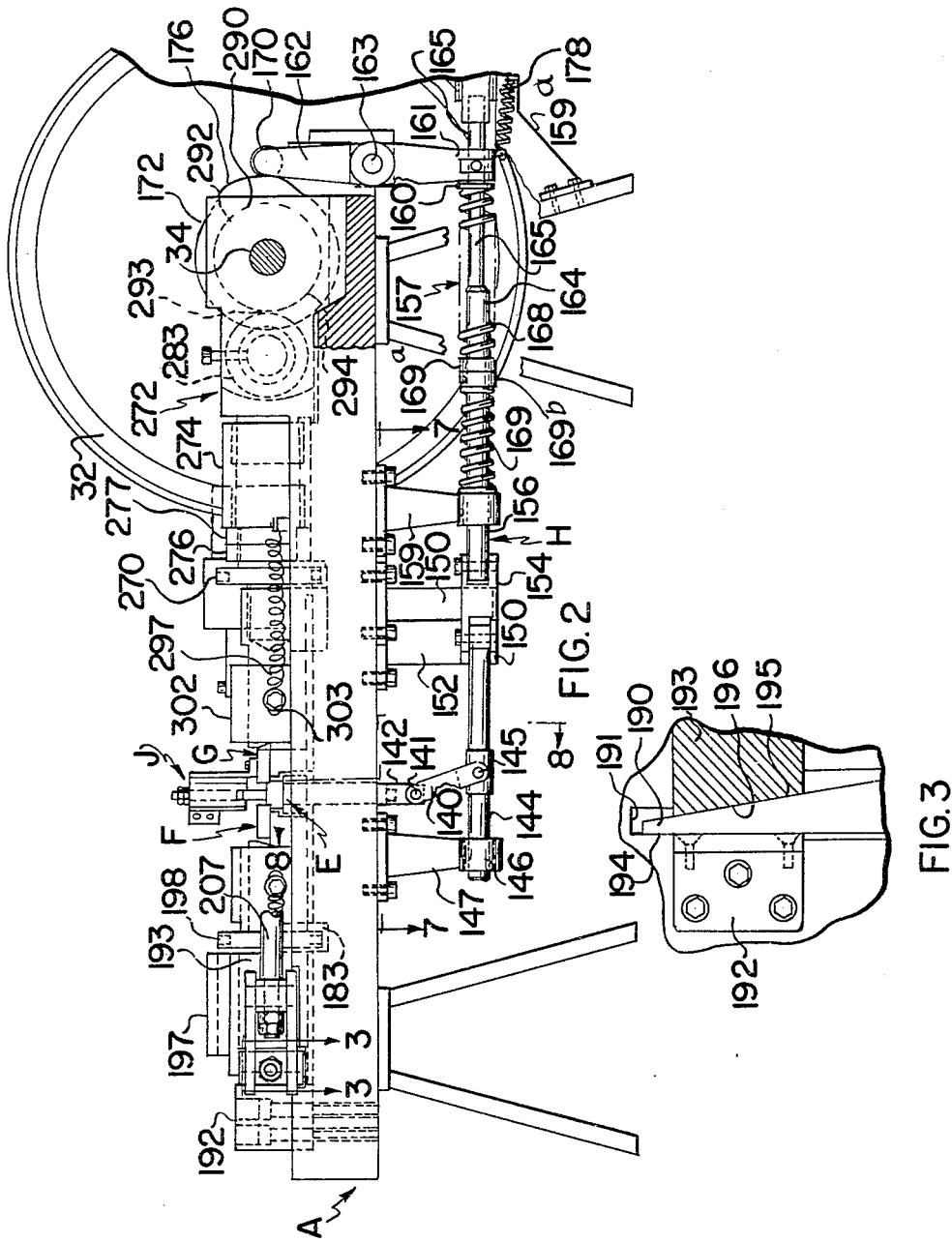

METHOD AND MACHINE FOR MAKING LOCKING FASTENERS

Filed Oct. 22, 1965     6 Sheets-Sheet 3

INVENTORS
WARREN E. BEUTLER
WILLIAM J. JAVORICH
BY
Hoffmann and Yount
ATTORNEYS

INVENTORS
WARREN E. BEUTLER
WILLIAM J. JAVORICH
BY
Hoffmann and Yount
ATTORNEYS

INVENTORS
WARREN E. BEUTLER
WILLIAM J. JAVORICH
BY
*Hoffmann and Yount*
ATTORNEYS INVENTORS
WARREN E. BEUTLER
WILLIAM J. JAVORICH
BY
Hoffmann and Hunt
ATTORNEYS United States Patent Office 3,486,179
Patented Dec. 30, 1969

3,486,179
METHOD AND MACHINE FOR MAKING
LOCKING FASTENERS
Warren E. Beutler, Willoughby, and William J. Javorich,
Cleveland, Ohio, assignors to The Lamson & Sessions
Co., Cleveland, Ohio, a corporation of Ohio
Filed Oct. 22, 1965, Ser. No. 501,468
Int. Cl. B21d 53/24
U.S. Cl. 10—72          20 Claims

ABSTRACT OF THE DISCLOSURE

Pair of anvil members are relatively moved to engage a fastener at opposed locations. The anvil members are then moved a fixed distance toward each other to indent the fastener. The fastener when positioned between the anvil members is also moved against a stop which positions the fasteners relative to the anvil members to locate the indentation by the anvil members relative to one end of the fastener.

---

The present invention relates to a method and machine for making a locking fastener and particularly to a method and machine for making lock nuts of the type having a noncircular or ovalized opening at their trailing end.

An object of the present invention is to provide a new and improved method and machine for making locking fasteners from internally threaded fasteners in which a pair of relatively movable tool members after engaging opposite side portions of the fastener are relatively moved through a predetermined distorting stroke regardless of the external dimensions of the fastener within tolerance limits and the resistance of the metal to the distorting stroke.

Another object of the present invention is to provide a new and improved method and machine for making locking fasteners from internally threaded fasteners in which a pair of tool members are relatively moved through a work stroke extending transversely of the axis of the fastener to distort opposite side portions thereof and wherein the fastener is positioned relative to the tool members prior to the tool members being relatively moved through the work stroke so that the transverse distorting forces are applied in a predetermined relation with one end face of the fastener.

Yet another object of the present invention is to provide a new and improved method and machine for making locking fasteners in which internally threaded fasteners to be distorted to form locking fasteners are positioned and held against an indenting tool movable through a predetermined and preferably adjustable work stroke extending transversely of the axis of the fastener after engaging the fastener to distort the fastener at one end thereof and in which the transverse indenting forces are applied in a predetermined relation with respect to the end face at the distorted end of the fasteners and in a manner such that substantially consistent locking characteristics are obtained regardless of variations in external height and transverse dimension within tolerance limitations.

A further object of the present invention is to provide a new and improved method and machine for distorting an internally threaded nut to form lock nuts having substantially consistent locking characteristics in which substantially uniform distortion is imparted to the nuts regardless of their external dimensions within tolerance limits by means of a distorting member which is positively reciprocated in a fixed and preferably adjustable work and return strokes transversely of the threaded opening from and to a predetermined position.

A still further object of the present invention is to provide a novel method and machine for making lock nuts having a noncircular or ovalized opening at their trailing end from preformed internal nuts having an internally threaded central opening wherein diametral opposite side wall portions of the preformed nuts are engaged by a pair of opposed tool members along a predetermined distance from the trailing end face of the nut and deflected inwardly toward the central opening by relatively moving the tool members through a positive fixed work stroke so that each of the lock nuts produced will have substantially consistent locking characteristics irrespective of the variation in tolerances of the external dimensions of the individual preformed nuts.

The present invention provides a new and improved method and machine for making lock nuts of the type referred to in which preformed nuts having an internally threaded opening are sequentially moved to a movable work support located between a pair of opposed relatively movable tool members, and wherein each nut is axially positioned relative to the tool members such that its trailing end is spaced a predetermined distance from the axis of movement of the tool members by moving the work support to cause the nut to be moved against a stop gauge means disposed above the work support and laterally positioned between the tool members by moving the latter relative to one another to engage diametral opposite side portions of the nut, and wherein the opposite side portions of the nut are deflected inwardly towards the center of the opening after being engaged by the tool members by relatively moving the same through a positive fixed work stroke. By so positioning the nut relative to the tool members and by relatively moving the tools through a predetermined work stroke after engaging the opposite side portions of the nut, each of the lock nuts produced will have their opposite side portion deflected along a predetermined distance from the trailing end face and inwardly toward the axis of the opening a substantially uniform amount whereby the lock nuts produced will have substantially consistent locking characteristics when applied to a threaded member irrespective of the variation within tolerance limits of their external dimensions.

The present invention further provides a new and improved lock nut making machine of the character described wherein the stop gauge means disposed above the work station includes gauge bar which is biased toward the work support and cooperates therewith to hold the nut on the work support and which is moved to engage a stop surface on the gauge means to position the trailing end face of the nut a predetermined distance from the axis of movement of the tools when the work support is moved toward the gauge means.

The present invention additionally provides a new and improved lock nut making machine of the character described wherein the length of the work stroke of the distorting tools and/or the stop surface of the gauge means can be varied or adjusted whereby the location and/or the amount of deflection of the diametral opposite portions of the nut can be varied so that lock nuts having different locking charateristics can be produced.

The lock nut making machine of the present invention further includes actuating mechanisms operatively connected with the work support and one of the tool members for moving the same to axially and laterally position the nuts, and wherein each of the actuating mechanisms includes a yieldable force transmitting means which yields when the nut is axially and laterally positioned against the stop gauge means and the other tool member.

The lock nut making machine of the present invention further includes an actuating mechanism including a pusher member for moving nuts from a receiving station to the work station and actuating mechanisms operatively connected with the work support and one of the tool members for moving the same to axially and laterally position the nuts, and wherein each of the actuating mechanisms includes a yieldable force transmitting means which yields in the event that the path of movement of either the pusher member, work station and tool, respectively, is blocked due to a malfunctioning or breakage of part of the machine.

The present invention also provides a new and improved lock nut making machine of the character described wherein the position of the stop surface in the gauge means and the relative positions of the tools can be adjusted so that different size lock nuts can be produced.

Other objects, novel characteristics and advantages of this invention will be apparent in the following detailed description and in the accompanying drawings forming a part of this specification and in which:

FIG. 1 is a top plan view with parts shown in section of the preferred embodiment of the lock nut making machine of the present invention;

FIG. 2 is a fragmentary side elevational view with parts shown in section of the lock nut making machine shown in FIG. 1 and looking in the direction of the arrows 2—2 of FIG. 1;

FIG. 3 is a fragmentary sectional view taken approximately along lines 3—3 of FIG. 2;

Figures 4, 5:
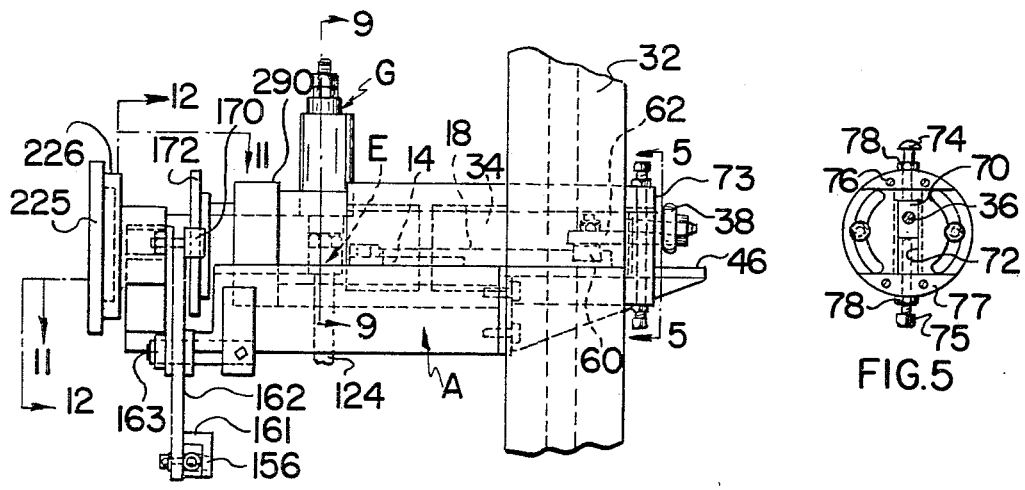
FIG. 4 is a fragmentary end elevational view of the lock nut making machine shown in FIG. 1.
FIG. 5 is a fragmentary elevational of part of the lock nut making machine shown in FIG. 4 looking in the direction of the arrows 5—5 of FIG. 4.

The present invention provides a novel method and machine for distorting internally threaded fasteners such as nuts to form a locking fastener. Although the novel method and machine could be readily adapted for making various kinds of lock fasteners wherein opposite side wall portions of an internally threaded fastener are deflected inwardly towards the central opening, it is particularly adapted and designed for making lock nuts of the type wherein diametral opposite side wall portions of preformed polygonal nuts are deflected inwardly at their trailing end to provide an ovalized threaded opening at the trailing end and free running threads at the other end, and will herein be described with reference to making that type of lock nut.

Referring to the drawings, a highly practical embodiment of a lock nut making machine for carrying out the method and manufacture of lock nuts of the type described above is there shown. The lock nut making machine comprises, in general, a supporting means or bed A, a feed means B for feeding preformed internally threaded polygonal nuts one at a time to a receiving station C on the bed A, a transfer means D for transferring the nut from the receiving station C to a vertically movable work support E at a work station located between a pair of horizontally disposed, opposed tool or anvil members F and G, a vertical positioning mechanism H operatively connected with the work support E for moving the nut upwardly relative to the tool members F and G and against a stop gauge means J to position the trailing end face of the nut in a predetermined position relative to the tool members F and G, a lateral positioning mechanism K operatively connected with the tool member F to laterally position the nut between the tool members F and G by moving the tool member F relative to the tool member G until both tool members F and G engage the diametral opposite side wall portions of the nut, and an indenting mechanism L for moving the tool member G through a positive fixed stroke while it is held against bodily movement by the tool member F to cause the diametral opposite side wall portions at the trailing end of the nut to be deflected inwardly towards the center of the opening a predetermined amount to define an ovalized opening at the trailing end of the nut.

The feed means B for feeding or supplying preformed internally threaded nuts 10, here shown as being hexagonal in shape, to the receiving station C may be of any suitable or conventional construction, and since it does not per se form a part of the present invention, it will only be described to the extent necessary to carry out the provisions of the present invention.

Suffice it to say that the feed means B includes an inclined feed chute 12 having a discharge opening 13 located immediately adjacent one side of the receiving station C. The nuts 10 are serially arranged in a side by side relationship within the chute 12 and are oriented therein such that one end face engages and is supported by the bottom of the chute 12 so that when they are fed to the receiving station C, they will be supported on their end face and have their axes extending in a vertical direction.

The nuts 10 are fed by gravity one at a time through the chute 12 and onto a rectangularly shaped plate 14 having a flat upper surface bolted to the top side of the bed A at the receiving station C. As a nut 10 is fed onto the plate 14 it engages a stop member 15 located immediately adjacent the other side of the receiving station and directly opposite from the discharge opening 13 of the chute 12. The stop member 15 is secured to the bed A by a bolt 16 which extends through a slot 17 in the stop member 15 and which threadably engages a threaded opening in the bed A. The provision of the slot 17 enables the stop member 15 to be adjustably positioned toward and away from the side of the receiving station C. The stop member 15 is preferably positioned relative to the discharge opening 13 such that only a single nut 10 can be positioned therebetween at any one time on the receiving station C. The stop member 15 serves to position a nut 10 at the receiving station C and in the path of movement of the transfer or pusher member 18 of the transfer mechanism D.

The pusher member 18 is reciprocably movable through a work stroke in which it pushes a nut 10 from the receiving station C to the work support E and in which it blocks the discharge opening 13 of the chute 12 and a return stroke in which it unblocks the discharge opening of the chute 12 and allows the next nut 10 in the chute 12 to be fed to the receiving station C. The pusher member 18 is of generally rectangular shape and is slidably supported by the bed A for linear movement through its work and return strokes. Movement of the pusher member 18 through its work and return strokes is guided at its inner end by the plate 14 which is received within a complementary shaped recess 19 in the bottom of the pusher member 18 and adjacent its outer end by a guide member 20 bolted to the top of the bed A. The pusher member 18 has a longitudinally extending recess 20a along its side which is adjacent the stop member 15 to enable the stop member 15 to be adjustably positioned without interfering with the movement of the pusher member 18.

To prevent the next nut 10 in the chute 12 from interfering with the movement of the pusher member 18 as it is reciprocated through its work stroke, a suitable nut release mechanism 21 actuatable in timed relationship with the nut transfer mechanism D and which functions to allow only a single nut to be fed to the receiving station C for each operating cycle of the pusher member 18 is preferably provided.

Figure 6:
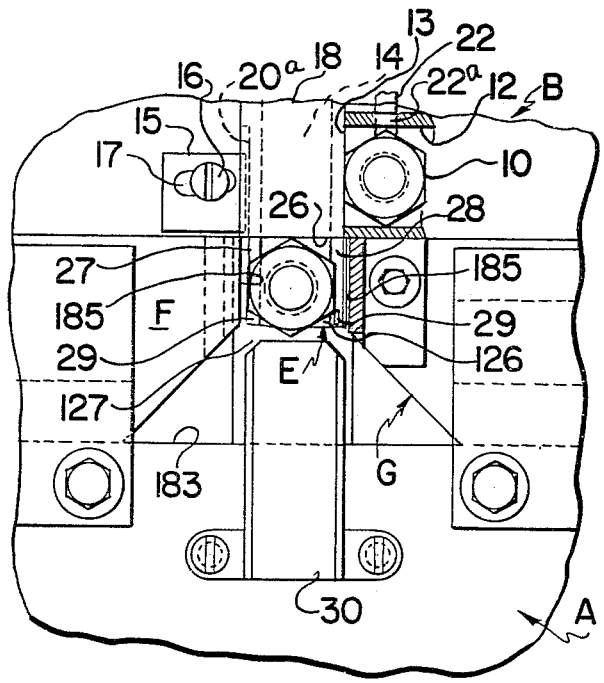
FIG. 6 is an enlarged fragmentary top plan view of part of the lock nut making machine shown in FIG. 1 showing parts thereof in different positions.
Figure 7:
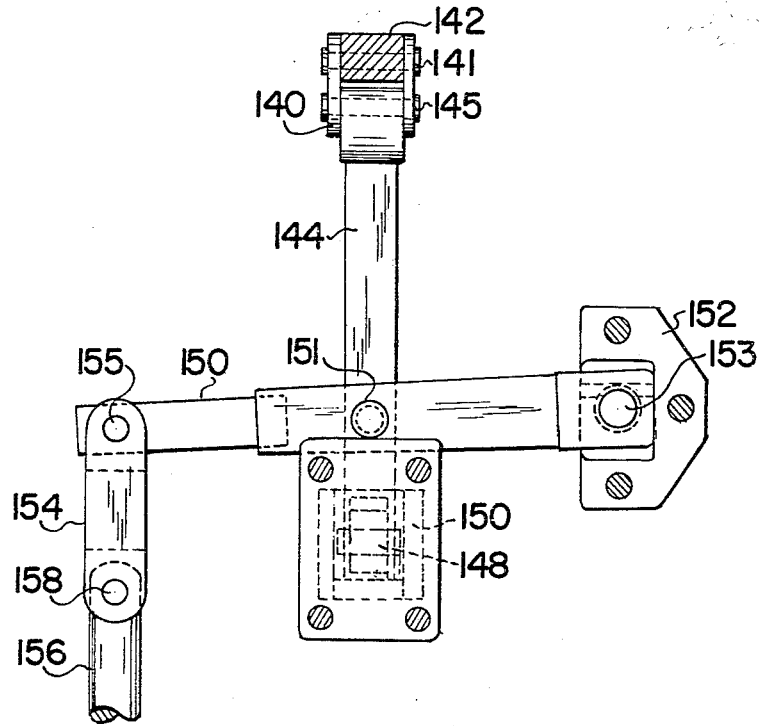
FIG. 7 is an enlarged fragmentary sectional view taken approximately along line 7—7 of FIG. 2.

The nut release mechanism 21 is here shown as including a spring biased plunger or rod 22 slidably supported in the guide member 20 and baised toward a nut holding position as shown in FIG. 6, wherein one end 22a of the rod 22 extends through a transverse opening in the feed chute 12 adjacent the discharge opening 13 thereof and into the interior of the feed chute 12 to clampingly engage the nut 10 next to the discharge opening 13 and prevent the same from passing through the discharge opening 13. The rod 22 adjacent its other end is slidably connected with an actuating member 23 secured to the pusher member 18. The rod at its other end carries an adjustably positionable nut 24 which is engaged by the member 23 during the latter portion of the return stroke of the pusher member 18 to move the rod 22 in opposition to the biasing force of the spring 25 from its nut holding position to a release position to allow the nut 10 previously clamped to pass through the discharge opening 13. When the pusher member 18 is moved through its work stroke, the member 23 slides relative to the rod 22 and the latter is returned to its nut holding position to clampingly engage the next nut in the chute by the spring 25.

Figure 8:
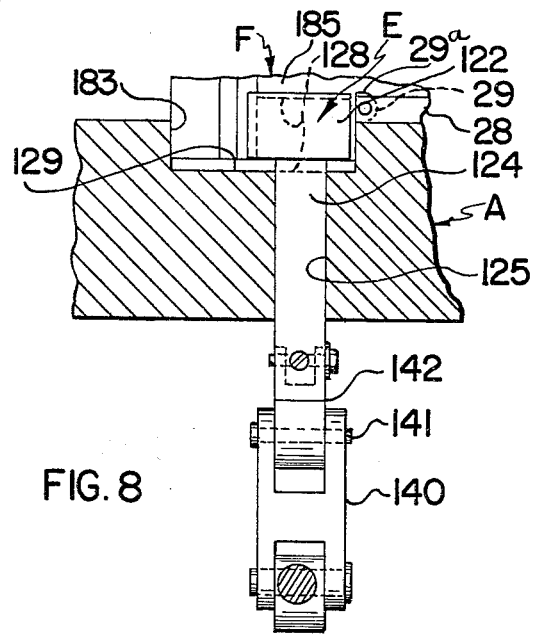
FIG. 8 is an enlarged fragmentary sectional view taken approximately along line 8—8 of FIG. 2.

The pusher member 18 has a flat end surface 26 which engages the nut 10 to push the same from the receiving station C to the work support E and a pair of laterally spaced forwardly extending fingers 27 and 28 each of which pivotally carries a member 29 disposed within a slot at its forward end for engaging and pushing the finished lock nut on the work support E onto a chute 30 located adjacent the side of the work support E opposite the pusher member 18. Each of the members 29 is movable about its pivotal connection between a first position in which a portion 29a thereof projects above the top surface of the finger and a second position in which the portion 29a thereof is flush with or disposed slightly below the top surface of the finger. The fingers 27 and 28 are slidable on the bed A and when the pusher member 18 has completed its return stroke it is in the position shown in FIGS. 1 and 8, wherein the discharge opening 13 of the chute 12 is unblocked and the members 29 are in their first position as a result of the engagement between their bottom portions and the bed A. The members 29 are retained in their first position and push the finished lock nut onto the chute during the work stroke of the pusher member 18 due to the engagement between the members and the finished lock nut. When the pusher member 18 has completed its work stroke, the end 26 is positioned immediately adjacent the work support E and the fingers 27 and 28 are located adjacent the laterally opposite sides thereof, as shown in FIG. 6. As the return stroke of the pusher member 18 is commenced, the members 29 engage the nut 10 just moved to the work support E and are deflected or moved to their second position so that the fingers 27 and 28 freely pass beneath nut 10 without disturbing its position on the work support E. The members 29 are returned to their first position when their bottom portions, which portions project beneath the fingers 27 and 28 when in their second position, engage the bed A just prior to the completion of the return stroke. If the finished lock nut on the work support E is of a size such that it does not project laterally beyond both sides of the work support E, it will be pushed onto the chute 30 by the nut being moved from the receiving station C to the work support E by the pusher member 18.

The pusher member 18 is reciprocated through its work and return strokes by an actuating means 31 of the nut transfer mechanism D. The actuating means 31 comprises a pulley 32 fixed to one end of a shaft 34 which is rotatably supported in a suitable housing mounted on the top side of the bed A. The pulley 32 is adapted to be driven by a suitable power means, such as an electric motor drivingly connected therewith by a V-belt. The pulley 32 at its outer end carries an eccentric pin 36 spaced from the axis of rotation of the pulley and which is pivotally connected at its outer end to one end of a crank arm 38. The other end of the crank arm 38 is bifurcated and pivotally connected by pivot pins 39 to a sleeve member 40 slidably disposed within a guide 44 bolted to the top side of a bracket 46. The bracket 46 is bolted to the side of the bed A and its top side is flush with the top side of the bed A.

The actuating means 31 further comprises a yieldable force transmitting means 47 which is operatively connected with the pusher member 18 and the sleeve 40. The yieldable force transmitting means 47 includes a piston 48 slidably disposed within the sleeve 40 and connected to one end of a piston rod 50 which projects rearwardly in the sleeve or toward the right, as viewed in FIG. 1. The piston rod 50 at its other end is slidably received within a central opening 51 of a bushing 52 threadably secured in the rearward end of the sleeve 40. The piston 48 is normally biased into engagement with an annular radially inwardly extending flange 53 at the forward or left end of the sleeve 40 by a compression spring 54 which encircles the rod 50 and has one end in abutting engagement with the piston 48 and the other end in abutting engagement with the bushing 52. The piston 48 is also connected to one end of a rod 56 which projects through the opening defined by the flange 53 and extends forwardly or to the left of the sleeve 40, as viewed in FIG. 1. The rod 56 at its other end carries a roller 58 which is disposed beneath the rod and rotatably connected thereto by a bolt 59 for rotation about a vertical axis. The roller 58 is disposed within an outwardly facing rectangular shaped recess 60 at one end of a bell crank lever 62.

The bell crank lever 62 is pivotally connected at its apex to the bracket means 46 by a pivot pin 64 for horizontal movement about the axis of the pivot pin 64. The bell crank lever 62 at its other or remaining end carries a roller 66 which is disposed therebeneath and rotatably connected thereto by a bolt 67 for rotation about a vertical axis. The roller 66 is disposed within a transversely extending recess 69 at the outer end of the pusher member 18.

From the foregoing, it should be apparent that when the pulley 32 is rotated the crank arm 38 is caused to be reciprocated, which in turn causes the sleeve 40 to be reciprocated within the guide 44. When the sleeve 40 is moved toward the left, as viewed in FIG. 1, the piston 48 and the rod 56 are moved toward the left by the spring 54 which exerts a sufficient force to cause this movement. Movement of the rod 56 toward the left causes the roller 58 carried thereby to engage the side wall of the recess 60 to rotate the lever 62 in a counterclockwise direction about the axis of the pivot pin 64. Movement of the lever 62 in a counterclockwise direction causes the roller 66 carried thereby to engage the side wall of the recess 69 in the pusher member 18 to cause the latter to be moved through its work stroke toward the work support.

When the sleeve 40 is moved toward the right, as viewed in FIG. 1, the inwardly extending flange 53 engages the piston 48 to cause the piston 48 and the rod 56 to be moved toward the right. Movement of the rod 56 toward the right causes the roller 58 carried thereby to engage the side wall of the recess 60 to rotate the lever 62 in a clockwise direction about the axis of the pivot pin 64. Movement of the lever 62 in a clockwise direction causes the roller 66 carried thereby to engage the side wall of the recess 69 in the pusher member 18 to cause the latter to be moved through its return stroke away from the work support E to the position shown in FIG. 1. When the lever 62 is pivoted about the pivot pin 64 in either the clockwise or counterclockwise directions the rollers 58 and 66 will roll or ride on the sides of the recesses 60 and 69 to accommodate the arcuate movement of the lever 62.

It will, of course, be understood that a suitable cam operated mechanism for reciprocating the sleeve 40 could be employed in place of the eccentric drive mechanism shown in the drawings, if desired.

The length of stroke imparted to the pusher member 18 can be varied by adjusting the position of the eccentric pin 36 relative to the axis of rotation of the pulley 32. As best shown in FIG. 5, the eccentric pin has a base portion 70 which is generally T-shaped in cross section and which is slidably disposed within a diametrically extending guide or channel 72 in the outer end 73 of the pulley 32. The eccentric pin 36 is adjustably positionable relative to the rotational axis of the pulley 32 by a pair of bolts 74 and 75 threadably engaged with mounting blocks 76 and 77 bolted to the outer end 73 of the pulley 32 and extending across the opposite ends of the guide 72 respectively. The bolts 74 and 75 project within the guide 72 and engage the opposite sides of the base portion 70 of the eccentric pin 36 to position the same relative to the rotational axis of the pulley 32. Each of the bolts 74 and 75 carries a nut 78 threadably engaged therewith and which is adapted to be tightened against the outer peripheral surface of its associated mounting block to lock the bolts 74 and 75 in position.

The provision of the yieldable force transmitting means 47 prevents the feed mechanism D from being damaged or broken in the event that the pusher member 18 cannot be moved through its work stroke due to a jam up of nuts at the work station or a malfunction or breakage of other parts of the machine blocking movement of the pusher member 18. When movement of the pusher member 18 is blocked, the piston 48 remains stationary and the spring 54 is compressed with the piston rod 50 sliding through the opening 51 in the bushing 52 while sleeve 40 is moved through its work stroke.

To prevent the pusher member 18 from over traveling during its work stroke and interfering with the subsequent operations to be performed at the work station due to a breakage or malfunctioning of the feed mechanism, an adjustable stop means 80 operatively associated with the lever member 62 is provided. The stop means 80 comprises a bolt 82 which extends through a transverse opening in an upwardly extending flange 83 of an L-shaped bracket mounted on the top side of the bed A adjacent the lever 62 and which is threadably engaged with a nut 84 welded on one side of the flange 83. The bolt 82 is adjustably positionable relative to the lever 62 and has a head which is adapted to be engaged by the lever 62 in the event the lever 62 overtravels when moving in a counterclockwise direction. A lock nut 85 threadably engaged with the bolt is provided for clampingly engaging the other side of the flange 83 to lock the bolt 82 in the desired position. The adjustable stop means 80 can also be employed for the purpose of reducing the length of the work and return strokes of the pusher member 18 by positioning the bolt 82 such that the lever 62 engages the head thereof prior to the sleeve member 40 having completed its work stroke. When engagement between the bolt 82 and the lever 62 occurs the sleeve 40 will move relative to the piston 48 and the spring 54 compressed until the end of the work stroke of the sleeve 40 has been completed.

Figure 9:
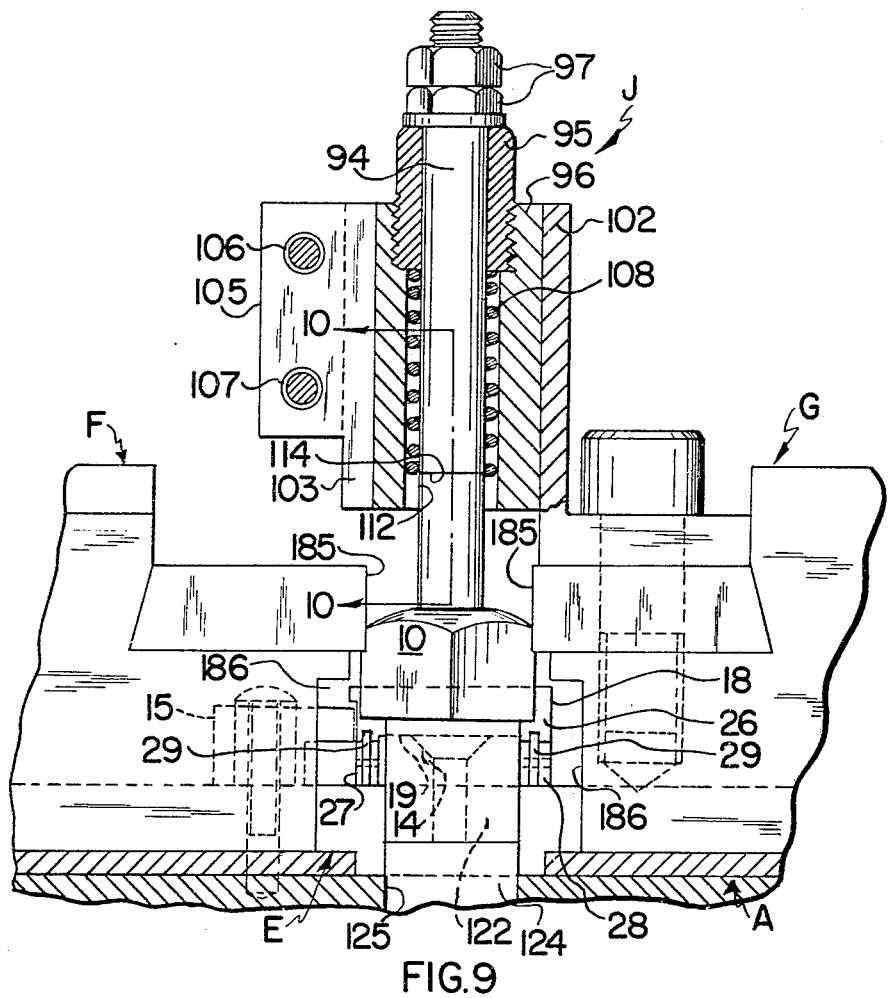
FIG. 9 is an enlarged fragmentary sectional view taken approximately along lines 9—9 of FIG. 3.

As the nut 10 is moved by the pusher member 18 from the receiving station C to the work support E at the work station, its trailing or upper end face 11 engages the underside 89 of a downwardly biased gauge and holddown bar 90 of the stop gauge means J, the bar 90 functioning to hold the nut 10 on the work support E and to prevent the same from being moved past the work station due to its momentum when pushed thereto by the pusher member 18. As best shown in FIG. 9, the bar 90 is vertically disposed above the work support E and comprises a rectangularly shaped head portion 93 and a circular shank portion 94 extending upwardly therefrom and which is slidably received within a bushing 95 threadably secured to a vertically disposed sleeve 96 at its upper end. The shank portion 94 at its upper end is threadably connected with a pair of nuts 97, the lowermost one of which engages the upper end of the bushing 95 to support the gauge bar 90 within the sleeve 96. The sleeve 96 is supported in its vertically disposed position above the work support E by a radially contractable split clamp 102 which in turn is welded or secured to a suitable bracket which is bolted to the top side of the tool member G. The split clamp 102 includes a pair of radially contractable and expandable arcuate extending side portions 103 and 104 with each of the sides having a radially extending flange 105 formed integral therewith. The opposite sides are adapted to be radially contracted to clampingly secure the sleeve 96 within the clamp and support the same above the work station E by a pair of bolts 106 and 107 which extend through an opening in one flange 105 and which are threadably engaged with a threaded opening in the other flange. A compression spring 108 encircling the shank portion 94 and having one end in abutting engagement with the lower end of the bushing 95 and the other end in abutting engagement with the top side of the head 93 is provided for biasing the gauge bar 90 in a downward direction until the nut 97 engages the outer end of the bushing 95.

Figure 10:
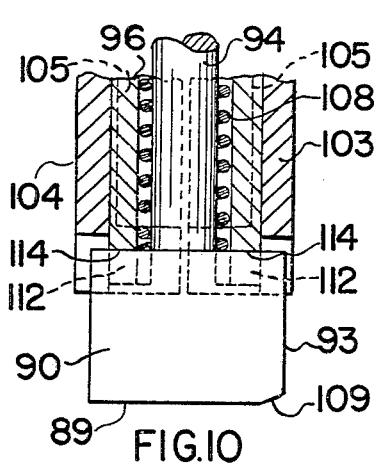
FIG. 10 is a fragmentary sectional view taken approximately along line 10—10 of FIG. 9.
Figure 13:
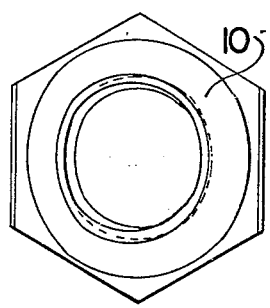
FIG. 13 is a top plan view of a lock nut looking down at its trailing end face.
Figure 11:
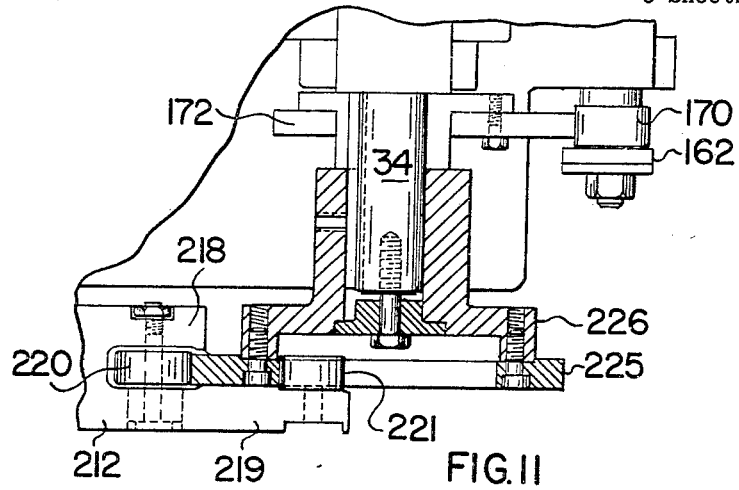
FIG. 11 is an enlarged fragmentary sectional view taken approximately along lines 11—11 of FIG. 4.
Figure 12:
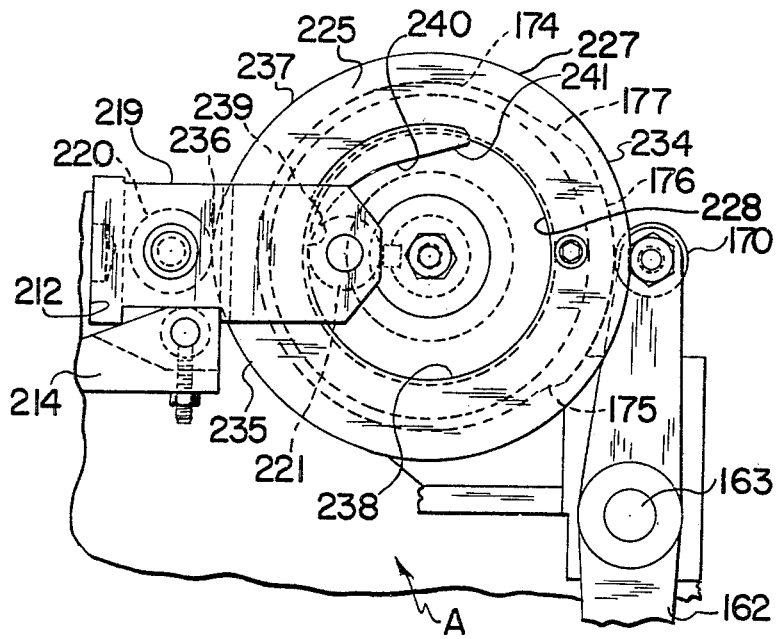
FIG. 12 is an enlarged fragmentary sectional view taken approximately along lines 12—12 of FIG. 4.

The bar 90 is axially positioned relative to the sleeve 96 by the nuts 97 such that the distance between the flat underside 89 of the bar 90 and the work support E is slightly less than the height of the nut 10. To facilitate movement of the nut 10 between the bar 90 and the work support E, the head portion 93 adjacent its end facing the receiving station C is beveled or tapered so as to provide an underside portion 109 which is upwardly inclined with respect to the work support E, as shown in FIG. 10. From the foregoing, it is apparent that as the nut 10 is pushed from the receiving station C to the work support E, its trailing end face engages the beveled underside portion of the gauge bar 90 and moves the gauge bar 90 upwardly relative to the sleeve 96 in opposition to the bias imposed by the spring 108 until the end face engages the flat horizontal portion of the underside 89 of the head 93. The bias imposed by the spring 108 on the bar 90 holds the nut 10 on the work support E and prevents the nut from being moved past the work support E due to the nut momentum when pushed thereto by the pusher member 18. The gauge bar 90 can be adjustably positioned relative to the work support E by loosening and repositioning the nuts 97.

After the nut 10 has been moved to the work station, the work support E and nut 10 are moved upwardly relative to the tool members F and G in opposition to the bias imposed by the spring 108 of the stop gauge means J until a trailing end face of the nut 10 is positioned a predetermined distance from their horizontal or longitudinally extending axes, which axes extend parallel to the direction of movement of the tool members. To this end, the sleeve 96 at its lower end has a pair of axially extending notches 112 at diametrically opposite locations which slidably receive the head portion 93 of the gauge bar 90. The notches 112 have horizontally disposed flat bottoms 114 spaced a predetermined distance from the horizontal or longitudinally extending axes of the tools F and G. The flat bottoms 114 define stop surfaces which are engaged by the top side of the head 93 to limit the extent of the upward movement of the gauge bar 90 when the work support E, nut 10 and gauge bar 90 are moved upwardly in opposition to the bias imposed by the spring 108. When the head 93 of the gauge bar 90 engages the bottoms 114 of the notches 112 the trailing end face of the nut 10 will be positioned so as to be spaced a predetermined distance from the horizontal axes of the tools F and G and thus, the tools F and G will engage the trailing end of the nut 10 along a predetermined distance from the end face thereof when the tool G is subsequently moved through its indenting stroke. The predetermined axial position to which the nut 10 is moved relative to the tools F and G can be adjusted by repositioning the sleeve 96 within the split clamp 102.

The work support E for supporting and moving the nut 10 upwardly relative to the tools F and G comprises having an upper head portion 122 and a lower shank portion 124 which is slidably received within a vertical through opening 125 in the bed A and which projects beneath the bed A. The head 122 has a flat top surface 126 and is disposed within a recess 127 in the top side of the bed A. The work support E is movable between a lower or nut receiving position, as indicated by the dotted lines 128 in FIG. 8, wherein the underside of its head 122 engages the bottom 129 of the recess and wherein the top side 126 is flush or disposed slightly below the top side of the plate 14 and an upper or nut locating position, as shown in FIG. 9, in which the work support E through the nut 10 being worked upon holds the head 93 of the gauge bar 90 in engagement with the bottoms 114 of the notches 112.

The work support E is adapted to be moved between its nut receiving position and its nut locating position by the vertical positioning mechanism H. The vertical positioning mechanism H comprises a link member 140 having one end portion pivotally connected by a pivot pin 141 to an adapter or bushing 142 secured to the lower end of the shank portion 124 of the work support E, as viewed in FIGS. 2 and 8. The other end of the link member 140 is pivotally connected to a horizontally disposed rod 144 extending longitudinally of the bed A by a pivot pin 145. As best shown in FIG. 2, the link member 140 is inclined with the pivotal axis of a pivot pin 141 being disposed to the left of the pivotal axis of the pivot pin 145 so that when the rod 144 is moved to the left the work support E will be moved upwardly and when the rod 144 is moved toward the right the work support E will be lowered or moved downwardly.

The rod 144 has one end slidably supported within a bushing 146 carried by a bracket 147 bolted to the underside of the bed A. The rod 144 at its other end is bifurcated and carries a roller 148 rotatably connected therewith. The roller 148 is supported by and rollably received within a channel member 150 which is bolted at its upper end to the underside of the bed A. The rod 144 intermediate its ends is pivotally connected to a link member 150 by pivot pin 151.

The link member 150 extends transversely to the rod 144 and has one end pivotally connected to a stationary support 152 bolted to the underside of the bed A by a pivot pin 153 for pivotal movement about a vertical axis. The other end of the link member 150 is pivotally connected to one end of a link member 154 by pivot pin 155. The link member 154 at its other end is pivotally connected to one end of a rod 156 of a yieldable force transmitting means 157 by a pivot pin 158. The rod 156 extends longitudinally of the bed A and is slidably supported adjacent its opposite ends by bushings carried by brackets 159 and 159a bolted to the underside of the bed A and to a support leg of the machine respectively. The rod 156 intermediate its ends carries a bushing 160 having a pair of opposed horizontally projecting pins which are slidably received in vertically extending slots in the bifurcated end 161 of a swingable lever 162 which is pivotally connected intermediate its ends to the bed A by a pivot pin means 163 for pivotal movement about a horizontal axis. The rod 156 comprises a large diameter portion 164 and a small diameter portion 165, the latter portion carrying the bushing 160 and being slidably supported by the bushing carried by the bracket 159a. The yieldable force transmitting means 157 further includes a pair of compression springs 168 and 169. The compression spring 168 encircles the rod 156 and has one end in abutting engagement with a nut 169a threadably engaged with a threaded end portion on the large diameter portion 164 of the rod 156 and its other end in abutting engagement with the bushing 160. The compression spring 169 encircles the rod 156 and has one end in abutting engagement with the bracket 159 and the other end in abutting engagement with the nut 169b. The compressive forces exerted by the springs 168 and 169 can be varied by adjusting the position of the nuts 169a and 169b on the rod 156.

Rotatably connected with the lever 162 at its upper end is a cam roller 170 which engages with the outer peripheral surface of a cam 172. The cam 172 is fixed on the shaft 34 and includes a dwell portion 174, a rise portion 175, a lobe portion 176 and a fall portion 177. The cam roller 170 is biased into engagement with the cam 172 by a tension spring 178, having one end connected to the bracket 159a and the other end to the end 161 of the lever 162 and which causes the lever 162 to pivot in a counterclockwise direction, as viewed in FIG. 2. When the roller 170 is engaged with the outer peripheral surface of the dwell portion 174 of the cam 172, the work support E is in its lower or nut receiving position, as indicated by the dotted lines 128 in FIG. 8. When the roller 170 is engaged with the outer peripheral surface of the lobe portion 176 of the cam 172, the work support E is in its upper or nut positioning position, as shown in FIG. 9.

From the foregoing, it should be apparent that when the pulley 32 is rotated the cam 172 is caused to rotate, which rotation is in a clockwise direction, as viewed in FIG. 2. When the rise portion 175 of the cam 172 engages the roller 170, the lever 162 is pivoted about the axis of the pivot pin means 163 in a clockwise direction. Movement of the lever 162 in a clockwise direction causes the yieldable force transmitting means 157 to move the link 154 toward the left, as viewed in FIG. 2. Movement of the link 154 toward the left causes the link 150 to pivot about its pivot pin 153 in a clockwise direction which in turn causes the rod 144 to be moved toward the left, as viewed in FIG. 2. Movement of the rod 144 toward the left causes the link 140 to be upwardly moved relative to the bed A. Movement of the link 140 in an upward direction causes the work support E to be moved upwardly from its nut receiving position toward its nut locating position. If the gauge bar 90 engages the stop surfaces 114 prior to when the roller engages the end of the rise portion of the cam 172, the springs 168 and 169 of the yieldable force transmitting means 157 will yield to allow the lever 160 to continue to be pivoted in a clockwise direction so that engagement between the roller 170 and the outer peripheral surface of the lobe portion 176 can be subsequently effected without damaging the mechanism H. Arcuate movement of the end 161 of lever 162 relative to the bushing 160 and rod 156 is accommodated as a result of the pin and slot connection between the bushing 160 and the lever 162. The work support E will remain in its upper or nut locating position for the duration of the time that the lobe portion 176 is in engagement with the roller 170 which length of time is sufficient to enable the nut 10 to be positioned laterally between the tools F and G and then indented.

When the fall portion 177 of the cam 172 engages the roller 170, the lever 160 is caused to be pivoted in a counterclockwise direction due to the biasing force imposed by the spring 178. The biasing force of the springs 168 and 169 causes the link member 140 to be moved downwardly which in turn causes the work support E to be moved toward its nut receiving position. Movement of the link member 140 in a downward direction causes the various parts of the mechanism H to be moved in the opposite direction from that described in the previous paragraph. When the dwell portion 174 of the cam 172 engages the roller, the work support E will be in its lower or nut receiving position and the link 142 will be in the position shown by the dotted lines 180 in FIG. 2.

After the nut 10 has been moved vertically relative to the tool or anvil members F and G and against the stop gauge means J, the tool member F is moved toward the tool member G until the nut 10 is positioned against the tool memebr G while the later is in its retracted position and to hold the nut against bodily movement when the tool member G is subsequently moved through a positive fixed work stroke so that the distorting effect of the work stroke will be the same for all nuts regardless of the variations within tolerance limits of their transverse dimensions. The members F and G are substantially identical in construction and therefore, only the tool member F will be described in detail. The tool member F comprises a block 182 which is slidably supported for linear movement within a longitudinally extending recess 183 in the top side of the bed A. Movement of the block 182 is guided by the side walls of the recess 183 and a guide member 184 bolted to the top side of the bed A and extending over the block 182. The block 182 at its forward end has a projecting portion which terminates, in the preferred embodiment, in a rectangularly shaped flat work engaging end or surface 185. The projecting portion of the block 182 is undercut, as indicated by reference numeral 186, to enable the work support E to be vertically moved relative thereto.

The tool member F is movable between a retracted position, as shown in FIG. 6, in which it permits a nut 10 to be pushed from the receiving station C to the work support E and a work holding position, as shown in FIG. 1, in which the work engaging ends 185 of the tools F and G engage diametral opposite side portions of the nut 10, here shown as being opposite parallel flats of the nut. If the nut 10 was not oriented so that its opposite flats extended parallel to the work engaging ends 185 of the tools F and G when it was moved to the work station E, it is so oriented when the tool member F is moved from its retracted to its work engaging position. While the nut 10 is being laterally positioned between the tools F and G, it slides relative to the work support and the gauge bar 90. The tool member F is biased towards its retracted position by a pair of tension springs 188 and 189. The springs 188 and 189 are each connected at one end to a pin 190 secured to the tool F and extending perpendicularly to the direction of movement of the tool member F and at the other end connected to a vertically disposed pin secured to a bed A.

The tool member F is adapted to be moved from its retracted position to its work holding position in opposition to the springs 188 and 189 by the lateral positioning mechanism K. The lateral positioning mechanism K comprises a wedge member or block 190 slidably supported within a recess 191 extending transversely of the bed A for reciprocal movement through work and return strokes. The wedge member 190 is disposed between a stationary abutment 192 and a movable abutment block 193 and has a flat side surface 194 extending parallel to its direction movement which slidably engages a flat side surface on the abutment block 192 and a flat tapered side surface 195 inclined with respect to the side surface 194 which slidably engages a complementary tapered surface 196 on the movable abutment block 193. The movable abutment block 193 is slidably supported for linear movement within the recess 183 with its movement being guided by the side walls of the recess 183 and a guide member 197 bolted to the bed A and disposed above the block 193. The block 193 at its forward end is threadably connected with an adjustment screw 198 having a head which is in abutting engagement with the rearward end of the tool member F. From the foregoing, it is apparent that when the wedge member 190 is moved through its work stroke, as indicated by the direction of the arrow 200, the abutment block 193 is caused to be moved toward the right, as viewed in FIG. 1. Movement of the abutment block 194 toward the right causes the screw 198, whose head abuts against the tool member F, to move the tool member F toward the right in opposition to the springs 188 and 189 to position the nut against the tool member G. When the wedge block 190 is moved through its return stroke, as indicated by the direction of the arrow 201, the springs 188 and 189 will cause the tool member F to be moved away from the work station and towards the left which in turn causes the screw and the movable abutment block 184 to be moved toward the left.

The lateral positioning mechanism K includes an actuating means 202 operatively connected with the wedge member 190 for moving the latter through its work and return strokes. The actuating means 202 includes a bell crank lever 204 which is pivotally connected at its apex to the bed A by a pivot pin 205 for pivotal movement about a vertical axis. The lever 204 is pivotally connected at one end to the wedge member 190 by a ball and socket connection 206 and is pivotally connected at its other or remaining end to one end of a rod 207 extending longitudinally alongside the bed A. The socket member of the ball and socket connection 206 is slidably disposed within a transverse recess 208 in the wedge member 190 and the pivotal connections between the lever 204 and the rod 207 is provided with sufficient slope so as to accommodate arcuate movement of the lever 204 about its pin 205. The rod 207 at its other end is pivotally connected to one end of a rod 209 of a yieldable force transmitting means 210 by a pivot pin 211. The rod 209 is slidably supported adjacent its end which is pivotally connected to the rod 207 by a suitable bushing carried by a bracket 211 bolted to the side of the bed A. The rod 209 at its other end is slidably connected with one end of a cam follower member 212 which in turn is slidably supported by a bushing carried by a suitable bracket 214 bolted to the bed A. The yieldable force transmitting means 210 further includes a compression spring 215 which encircles the rod 209 and has one end in abutting engagement with the cam follower member 212 and the other end in abutting engagement with a nut 216 carried by the rod 209 adjacent its end which is pivotally connected with the rod 207. The rod 209 at its other end carries a nut 217 to prevent the rod 209 and the cam follower means 212 from separating or disconnecting.

The cam follower member 212 at its other end is bifurcated to define a pair of spaced legs 218 and 219 with the leg 219 being of a greater length rotatably connected between the legs 218 and 219 and to the leg 219 adjacent its free end are a pair of cam followers or rollers 220 and 221, respectively, for rotation about generally horizontal axes.

The rollers 220 and 221 are positioned such that they receive and straddle an annular rotatable cam track 225 therebetween. The cam track 225 is bolted to a cup shaped member 226 which in turn is fixed to the shaft 34. The cam track 225 has outer and inner peripheral surfaces defining outer and inner cams 227 and 228 which are adapted to engage the rollers 220 and 221, respectively. The outer cam 227 has a dwell portion 234, a rise portion 235, a lobe portion 236 and a fall portion 237.

The inner cam 228 has a dwell portion 238, a rise portion 235, a lobe portion 240 and a fall portion 241.

When the pulley 32 is rotated, the cam track 225 is caused to be rotated, which rotation is in a clockwise direction as viewed in FIG. 2. As the cam track 225 is rotated and the rise portion 239 of the inner cam 228 engages the roller 221, the cam follower member 212 is moved toward the right. As the cam follower member 212 is moved toward the right, it engages the nut 217 to cause the rod 209 to be moved toward the right, which in turn causes the rod 207 to be moved toward the right.

Movement of the rod 207 toward the right causes the lever 204 to be pivoted about the axis of the pivot pin 205 in a counterclockwise direction which in turn causes the wedge member 190 to be moved through its return stroke, as indicated by the direction of the arrow 201. As the wedge member 190 moves through its return stroke, the tool member F is moved toward the left and to its retracted position by the springs 188 and 189, and in the manner hereinbefore described. The wedge member 190 is retained in its retracted position at the end of the return stroke while the roller 221 is engaged with the lobe portion 240 of the inner cam 228. When the roller 221 engages the fall portion 241 and then the dwell portion 237 of the inner cam 228, the cam follower member 212 is free to be moved toward the left.

Further movement of the cam track in a clockwise direction causes the rise portion 235 of the outer cam 227 to engage the roller 220 and the cam follower member 212 to be moved toward the left, as viewed in FIG. 2. Movement of the follower member 212 toward the left causes the rod 207 through the yieldable force transmitting means 210 to be moved toward the left. Movement of the rod 207 toward the left causes the lever 204 to pivot in a clockwise direction about the axis of the pivot pin 205 which in turn causes the wedge member 190 to be moved through its work stroke, as indicated by the direction of the arrow 200. As the wedge member 190 is moved through its work stroke, the tool member F is caused to be moved toward the tool member G in opposition to the bias imposed by the springs until it positions the nut against the tool member G. The tool member F will be retained in its work holding position while the roller 220 is in engagement with the lobe portion 236 of the outer cam 227 and until the roller 220 engages the fall portion 237 thereof. If the tool member F positions the nut 10 against the tool member G prior to the roller 220 engaging the outermost outer peripheral surface of the lobe portion 236, the spring 215 of the yieldable force transmitting means 210 will compress to allow the follower member 212 to continue to be moved toward the left until the roller 220 does engage the outer peripheral surface of the lobe portion 236.

It should be pointed out that the lobe portions 176, 236 of the cams 172 and 227 are angularly related such that the cam 172 will cause the nut to be vertically positioned just prior to the cam 227 causing the nut 10 to be laterally positioned between the tools F and G. The provision of the cam 228 provides for positive movement of the wedge member 190 through its return stroke to its retracted position to thereby insure that the tool F can be moved to its retracted position.

The provisions of the yieldable force transmitting means 157 and 210 in the vertical and lateral positioning mechanisms H and K will prevent damage to these mechanisms in the event that the work support E is unable to be moved vertically or the tool F is unable to be moved horizontally toward the tool member G, respectively, due to a breakage or malfunctioning of any part of the apparatus.

After the nut 10 has been vertically and laterally positioned relative to tool members F and G, the tool member G is positively moved through a fixed work stroke by the indenting mechanism L to cause the opposite sides of the trailing end of the nut 10 to be deflected inwardly towards the central opening in the nut to provide a lock nut having an ovalized opening at its trailing end. The indenting mechanism L includes an adjustable screw 270 threadably connected to the rearward end of a tool member G and having a head 271 which abuts the forward end of a force transmitting means 272. The force transmitting means comprises an actuating member 273 which is slidably received within a guide or abutment block 274 bolted to the top side of the bed A. The actuating member 273 has a shaft portion 275 whose forward end is threadably engaged with a pair of nuts 276 and 277, the rearwardmost nut 277 engaging the forward side surface 278 of the guide 274 and forming a stop for the tool G to position the latter in its retracted position when moved through its return stroke. The actuating member 273 is bifurcated at its rearward end to define a pair of spaced arms 280, 281 which carry a cam follower or roller 283 disposed therebetween and rotatably connected therewith by a pivot pin 285. The cam roller 283 is adapted to be engaged by the outer peripheral surface of a rotatable cam 290. The cam 290 is fixed to the shaft 34 and has a dwell portion 292, a rise portion 293 and a fall portion 294.

The tool G is adapted to be moved between a retracted position, as shown in FIG. 6, in which it permits a nut 10 to be pushed from the receiving station B to the work support E and an indenting position, as shown in FIG. 9. The tool G is normally biased towards its retracted position by a pair of springs 296 and 297 having one end connected with a horizontally disposed pin 298 extending transversely through the tool G and the other end connected to vertically disposed pins 299 and 300 fixed to the bed A. The movement of the tool G is guided by the side walls of the recess 183 and a guide member 302 disposed thereabove bolted to the top side of the bed A. The guide member 302 has an enlarged slot-like 303 opening therethrough through which the pivot pin 298 passes so as to enable the tool member G to be moved through its work and return strokes.

The tool member G is positively moved through its work stroke by the cam 290. As the cam 290 is rotated the rise portion 293 thereof engages the roller 283 to cause the actuating member 272 to be moved toward the left in opposition to the bias imposed by the springs 296 and 297, as viewed in FIG. 1. Movement of the actuating member 272 toward the left causes the screw 270 and the tool G to be moved toward the left. When the roller 283 engages the outer end of the rise portion 293 of the cam 290, the tool has been moved through its work stroke and is in its indenting position, as shown in FIG. 9. As the roller 283 engages the fall portion 294 of the cam, the tool G and the actuating member 272 are moved toward the right, as viewed in FIG. 1, by the springs 296 and 297 until the nut 277 engages the end surface 278 of the guide 274 or the roller 283 engages the dwell portion 292 of the cam 290.

When the tools F and G have been moved to their retracted position, the next nut at the receiving station B is moved to the work support E. As the next nut is moved toward the work support E, it engages the finished nut of the work support E and moves the same onto a discharge chute 350 located adjacent the side of the work station which is directly opposite from the receiving station.

From the foregoing, it is apparent that when the tool member G is positively moved through its work stroke the opposite sides of the nut 10 will be deflected inwardly toward the central opening in equal amounts since the tool F is held stationary as a result of the engagement between the wedge member 190 and the movable abutment block 194 and exerts an oppositely directed force of equal magnitude to the force transmitted thereagainst through the nut by the tool G. It is also apparent that since each of the nuts is positioned such that its trailing end face is located a predetermined distance from the horizontal or longitudinal axis of the tools F and G and since the tool member G is positively actuated through a fixed or predetermined work stroke, that the amount of deflection imparted to the nuts will be identical or substantially identical irrespective of the variations in the width or the height of the nuts. Therefore, the lock nuts produced will have identical or substantially identical locking or prevailing torque characteristics irrespective of the variations within tolerance limitations of their external dimensions.

The length of the work stroke imparted to the tool member G and hence, the amount of deflection imparted to the opposite sides of the trailing end of the nuts can be varied by repositioning the nuts 276 and 277 on the shaft portion 275 of the actuating member 273. If the nut 277 is positioned such that the roller 283 engages the dwell portion 292 of the cam when the tool G is moved through its return stroke, the length of the work stroke will be at a maximum, since the tool G will be moved a distance equal to the radial extent of the rise portion 293 of the cam 290. If the nut 277 is positioned such that it engages the stop surface 278 prior to the roller 283 engaging the dwell portion 292 of the cam 290, when the tool G is moved through its return stroke, the cam 290 will subsequently engage the roller 283 at a location along the rise portion 293 spaced from the innermost end thereof and the work stroke of the tool G will be less than the possible maximum. It is thus apparent that the indenting mechanism L enables the work stroke of the tool G to be changed without changing the indenting position of the tool G relative to the rotational axis of the cam 290.

The retracted positions to which the tools F and G are moved relative to the work support E can be varied so as to accommodate different size nuts by repositioning the screws 196 and 270 relative to the abutment block 194 and the tool G, respectively. The provision of the adjustable screw 270 in the indenting mechanism L enables the indenting and retracted positions of the tool G to be changed relative to the work support E without changing the work stroke of the tool G.

In view of the above, it can be seen that a novel method and machine for making locking fasteners, such as lock nuts having a noncircular or ovalized opening at one end, form preformed internally threaded fasteners and wherein the locking characteristics of the locking fasteners produced will be substantially consistent irrespective of the variations within tolerance limitations of the external dimension has been provided. Moreover, it can be seen that a novel method and machine for making locking fasteners from preformed internally threaded fasteners wherein a pair of relatively movable tools upon engaging diametral opposite side portions of the fastener and at a predetermined location with respect to one end of the fastener are relatively moved through a positive fixed work stroke to distort or deflect the opposite side portions toward each other a predetermined amount has been provided. Additionally, it can be seen that a novel machine for making locking fasteners wherein the length of the positive work stroke of the tools and/or the location at which the opposite side portion of the fasteners are distorted with respect to one end face thereof can be readily adjusted or varied to enable locking fasteners having different locking characteristics to be produced. Furthermore, it can be seen that a novel machine for making locking fasteners has been provided wherein the various machine parts and mechanisms can be readily adjusted to accommodate different size fasteners.

It will of course be understood that the nuts 10 could be oriented and moved to the work support E and/or the work engaging ends of the tools F and G modified such that diametral opposite corner portions of the nut would be engaged and deflected to provide lock nuts having a noncircular or ovalized opening.

Although the lock nut making machine of the present invention has been illustrated and described herein to a somewhat detailed extent, it will be understood, of course, that the invention is not to be regarded as being limited correspondingly in scope, but includes all changes and modifications coming within the terms of the claims herein.

Having described our invention, we claim:

1. In a machine for indenting an internally threaded fastener to form a lock fastener, a support means, an indenting member slidably supported by said support means for linear movement relative thereto between a retracted position and an indenting position, said indenting member moving in a first direction through a predetermined positive work stroke when moved from its retracted position to its indenting position, means for positioning said fastener against said indenting member with its axis thereof extending perpendicular to said direction of movement of said indenting member while the latter is in its retracted position, said positioning means including an anvil member for holding the fastener against bodily movement and which applies a localized force when said indenting member is moved through said fixed work stroke to indent said fastener, and actuating means for positively moving said indenting member in said first direction through said fixed work stroke to indent the fastener positioned thereagainst and biasing means for biasing said indenting member in a return direction to return said indenting member to said retracted position upon completion of the work stroke, said actuating means comprising an actuating member movable in a fixed path relative to said support means and which engages a force transmitting means connected with said indenting member during at least a portion of its path of movement to move the same in said first direction and cause said indenting member to be positively moved through its work stroke, and a stop member on said force transmitting means which engages an abutment on said support means to limit the movement of said force transmitting means and said indenting member to position the force transmitting means in a predetermined position relative to said actuating member and said indenting member in its retracted position when said biasing means moves said indenting member in said return direction.

2. In a machine as defined in claim 1 wherein said stop member is adjustably positionable on said force transmitting means to vary the predetermined position relative to said actuating member to which it is moved and the retracted position to which the indenting member is moved by the biasing means whereby the work stroke of the indenting member can be varied without changing the indenting position of the indenting member relative to the support means.

3. In a machine as defined in claim 2 wherein said actuating member is a rotatable cam having a rise portion and a fall portion and wherein said force transmitting means includes a cam follower which is adjustably positionable relative to the rotational axis of the cam by said adjustable stop member when the force transmitting means is moved in the return direction.

4. In a machine for indenting an internally threaded nut to form a lock nut, a support means, an indenting member slidably supported by said support means for linear movement relative thereto between a retracted position and an indenting position, said indenting member moving in a first direction through a fixed positive work stroke when moved from its retracted position to its indenting position, a stop gauge means disposed above said indenting member and having a stop surface spaced a predetermined distance from the axis of the indenting member which coincides with said direction of movement of said indenting member, means for positioning one end face of said fastener against said stop gauge means so that the end face is spaced a predetermined distance from said axis of said indenting member, second positioning means for positioning said fastener against said indenting member with its axis extending perpendicular to the direction of movement of the indenting member while the latter is in its retracted position, said second positioning means including an anvil member for holding the fastener against bodily movement and which applies a localized force when said indenting member is moved through said work stroke to indent said fastener, an actuating means for positively moving said indenting member in said first direction through said fixed work stroke to indent the fastener positioned thereagainst and in a return direction to return said indenting member to said retracted position upon completion of the work stroke.

5. In a machine as defined in claim 4 wherein said stop gauge means includes means for adjustably positioning said stop surface relative to said axis of said indenting member.

6. In a machine as defined in claim 4 wherein said anvil member is slidably supported by said support means for linear movement relative thereto between a retracted position and a nut positioning position in which it holds the nut against the indenting member, and an actuating means for moving said anvil member between said retracted and nut positioning positions.

7. In a machine as defined in claim 6 wherein said actuating means for moving said anvil member includes a reciprocably movable wedge block slidably engaged with a stationary abutment on said support means and a movable abutment connected and with said anvil member, biasing means for biasing said anvil member toward its retracted position and said movable abutment into engagement with said wedge block, said wedge block and said movable abutment having mating surfaces inclined with respect to the direction of movement of said wedge block, and means for reciprocating said wedge block including a yieldable force transmitting means which yields when said nut is engaged by said anvil member and said indenting member.

8. In a machine as defined in claim 6 including adjustment means in each of the actuating means for moving said anvil and indenting members for adjusting the positions of the anvil and indenting members relative to each other so that nuts of different sizes can be indented.

9. In a machine for indenting an internally threaded nut to form a lock nut, a support means, an indenting member slidably supported by said support means for linear movement relative thereto between a retracted position and an indenting position, said indenting member moving in a first direction through a fixed positive work stroke when moved from its retracted position to its indenting position, a stop gauge means disposed above to its indenting position, a stop gauge means disposed above said indenting member and having a stop surface spaced a predetermined distance from the axis of said indenting member which coincides with the direction of movement of the latter, first means for positioning one end face of said nut against said stop gauge means so that said end face is spaced a predetermined distance from said axis of the indenting member, said first positioning means including a support member supported by said support means for movement relative thereto toward and from said stop gauge means and which supports said nut on its other end face and an actuating mechanism operatively connected with said movable support member for moving the latter toward said stop gauge means to move said one end face of said nut against said stop gauge means, second positioning means for positioning said nut against said indenting member while the latter is in its retracted position, said second positioning means including an anvil member for holding the nut against bodily movement and which applies a localized force thereto when said indenting member is moved through said work stroke to indent said nut, an actuating means for positively moving said indenting member in said first direction through said fixed work stroke to indent the fastener positioned thereagainst and in a return direction to return said indenting member to said retracted position upon completion of the work stroke.

10. In a machine, as defined in claim 9, and further including means for sequentially feeding preformed internally threaded nuts to said movable support located between said indenting member and said anvil member, and wherein said stop gauge means includes means for engaging one end face of said nut to hold the same on said movable support when said nut is being fed thereto.

11. In a machine, as defined in claim 11, wherein said stop gauge means includes a sleeve having a stop surface, and wherein said means is engaging and holding said nut on said movable support includes a gauge bar supported in said sleeve for movement relative thereto between a first position in which its underside is spaced from the movable support a distance being slightly less than the height of the nut and a second position in which it engages the stop surface on the sleeve to position said one end face of the nut a predetermined distance from the axis of the indenting member, the underside of said gauge bar adjacent its side from which the nuts are fed being inclined away from said work support member to facilitate movement of the nut, the gauge bar and the work support member.

12. The method of making locking fasteners from preformed internally threaded fasteners comprising the steps of: feeding a preformed fastener having an internally threaded central opening between a pair of opposed anvil members which are relatively movable toward and away from each other in first and second directions and such that its axis extends perpendicular to the direction of relative movement of the opposed anvil members, relatively moving said opposed anvil members toward each other until they engage diametral opposite side portions of the fastener, to space the anvil members a distance from each other which varies with the outside diameter of the nut where engaged by the anvil members, and relatively moving said opposed anvil members towards each other through a positive fixed work stroke after they engage the opposite portions of the fastener which work stroke is indepedent of the spacing between the anvil members at the start of the work stroke to cause said side portions to be deflected inwardly toward the axis of the central opening a predetermined amount.

13. The method of making locking fasteners from preformed internally threaded fasteners comprising the steps of: feeding a preformed fastener having an internally threaded central opening between a pair of opposed anvil members which are relatively movable toward and away from each other in first and second directions and such that its axis extends perpendicular to the direction of relative movement of the opposed anvil members, moving one said opposed anvil member toward the other while the other remains stationary until said anvil members engage diametral opposite side portions of the nut, and moving the other anvil member towards said one anvil member while the latter remains stationary through a positive fixed work stroke to cause said side portions to be deflected inwardly toward the axis of the central opening a predetermined amount.

14. The method of making a locking fastener from a preformed internally threaded fastener comprising the steps of: moving a preformed internally threaded fastener between a pair of relatively movable opposed anvil members with its axis extending perpendicular to the direction of relative movement of said anvil members, axially positioning said nut relative to said opposed anvil members so that one end face thereof is spaced a predetermined distance from the axis of the anvil members which coincides with their direction of relative movement, relatively moving said anvil members toward each other until they engage diametral opposite side portions of the fastener, to space the anvil members a distance from each other which varies with the outside diameter of the nut where engaged by the anvil members, and relatively moving said anvil members through a positive fixed work stroke after engaging the diametral opposite side portions which work stroke is independent of the spacing between the anvil members at the start of the work stroke to cause said side portions to be deflected inwardly toward the axis of a central opening therein a predetermined amount.

15. The method of making a locking fastener from a preformed internally threaded fastener by distorting diametral opposite side portions thereof comprising the steps of: feeding a preformed internally threaded fastener to a movable work support which is located between a pair of relatively movable opposed anvil members and which supports the fastener one end face with its axis extending perpendicular to the direction of relative movement of said anvil members, moving said work support relative to said anvil members and against a stop gauge means disposed about the work support until the other end face of the fastener is spaced a predetermined distance from the axis of the anvil members which coincides with their direction of relative movement, moving one of said anvil members toward the other anvil member while the latter remains stationary to position the fastener against the other anvil member, moving the other of said anvil members through a positive fixed work stroke after the fastener is positioned thereagainst and while said one anvil member remains stationary and holds the fastener against movement to cause the side portions engaged by the anvil members to be deflected inwardly toward the axis of the fastener a predetermined amount.

16. In a machine for indenting an internally threaded fastener to form a lock fastener, a support means, anvil means comprising a pair of opposed anvil members on said support means which are adapted to engage the opposite sides of a fastener disposed therebetween, said anvil members being relatively movable toward and away from each other, positioning means operatively connected to said anvil means to relatively move said anvil members to engage each with a fastener disposed therebetween, and power actuated means for relatively moving said anvil members toward each other through a work stroke of predetermined length after engagement of said anvil members with a fastener with said work stroke being independent of the spacing between said anvil members to apply opposed localized forces to said fastener to indent the same.

17. In a machine as defined in claim 16, said machine further comprising means for adjusting said predetermined length of said work stroke.

18. In a machine as defined in claim 16 wherein one of said anvil members has a retracted position and said positioning means comprises means for moving the other of said anvil members to move a fastener against said one of said anvil members with the latter in said retracted position, said power actuated means being operatively connected to said one of said anvil members to positively drive said anvil member from said retracted position through said predetermined work stroke.

19. In a machine as defined in claim 18, said machine further comprising means for adjusting said predetermined length of said work stroke.

20. In a machine for indenting an internally threaded fastener to form a lock fastener, a support means, an indenting member supported by said support means and being movable relative thereto in a first direction through a fixed positive work stroke, means for positioning said fastener against said indenting member with its axis thereof extending perpendicular to said direction of movement of said indenting member, said positioning means including an anvil member for holding the fastener against bodily movement and which applies a localized force thereto when said indenting member is moved through said fixed work stroke to indent said fastener, and means for positively moving said indenting member in said first direction relative to said support means through said fixed work stroke to indent the fastener positioned thereagainst and in a return direction through a return stroke upon completion of said work stroke, said last named means including a biasing means for biasing said indenting member in the return direction toward said predetermined position, stop means for limiting the movement of said indenting member in said return direction when in said predetermined position, and a cam means for driving said indenting member in said first direction through said work stroke.

References Cited

UNITED STATES PATENTS

| | | | |
|---|---|---|---|
| 2,859,459 | 11/1958 | Stoll | 10—72 |
| 3,171,143 | 3/1965 | Storch et al. | 10—72 |

LEONIDAS VLACHOS, Primary Examiner

U.S. Cl. X.R.

10—86

PO-1050
(5/69)

UNITED STATES PATENT OFFICE
CERTIFICATE OF CORRECTION

Patent No. 3,486,179  Dated December 30, 1969

Inventor(s)  Warren E. Beutler and William J. Javorich

It is certified that error appears in the above-identified patent and that said Letters Patent are hereby corrected as shown below:

In the claims: Column 17, lines 43 and 44, delete after "position" in line 43, the words " a stop gauge means disposed above to its indenting position"

Column 18, line 3, for "11" second occurrence, read "10"

SIGNED AND
SEALED
JUN 23 1970

(SEAL)
Attest:

Edward M. Fletcher, Jr.
Attesting Officer

WILLIAM E. SCHUYLER, JR.
Commissioner of Patents